US010311769B2

(12) United States Patent
Ogoshi

(10) Patent No.: US 10,311,769 B2
(45) Date of Patent: Jun. 4, 2019

(54) IMAGE PROCESSING PROVIDING UNIFORMITY CORRECTION DATA GENERATION FOR COLOR SIGNALS

(71) Applicant: JVC KENWOOD CORPORATION, Yokohama-shi, Kanagawa (JP)

(72) Inventor: Daisuke Ogoshi, Yokohama (JP)

(73) Assignee: JVC KENWOOD CORPORATION, Yokohama-shi, Kanagawa (*) Notice: Subject to any disclaimer, the term of this patent is extended or adjusted under 35 U.S.C. 154(b) by 14 days.

(21) Appl. No.: 15/401,332

(22) Filed: Jan. 9, 2017

(65) Prior Publication Data
US 2017/0116901 A1 Apr. 27, 2017

Related U.S. Application Data

(63) Continuation of application No. PCT/JP2015/063730, filed on May 13, 2015.

(30) Foreign Application Priority Data

Aug. 26, 2014 (JP) ................. 2014-171282

(51) Int. Cl.
G09G 3/36 (2006.01)
G09G 3/20 (2006.01)
(Continued)

(52) U.S. Cl.
CPC ............ G09G 3/2003 (2013.01); G09G 3/20 (2013.01); H04N 9/68 (2013.01); H04N 17/02 (2013.01);
(Continued)

(58) Field of Classification Search
CPC ............................................. G09G 2320/0233
See application file for complete search history.

(56) References Cited

U.S. PATENT DOCUMENTS

2001/0008395 A1* 7/2001 Yamamoto ........... G09G 3/3406
345/102
2006/0038825 A1* 2/2006 Sakashita ............ G09G 3/3607
345/592
(Continued)

FOREIGN PATENT DOCUMENTS

JP H9-138673 A 5/1997
JP 2001-69373 A 3/2001
(Continued)

OTHER PUBLICATIONS

Search Report dated Jul. 3, 2017 in counterpart European application No. 15836949.6.
(Continued)

Primary Examiner — Sanghyuk Park
(74) Attorney, Agent, or Firm — Nath, Goldberg & Meyer; Jerald L. Meyer; Stanley N. Protigal

(57) ABSTRACT

A uniformity correction data generation unit generates uniformity correction data for an R signal, a G signal, and a B signal. A multiplier multiplies pixel signals of the R signal, the G signal, and the B signal by the uniformity correction data for the R signal, the G signal, and the B signal. The multiplier shifts, from one another, positions of pixels at a time of multiplying the pixel signals of the R signal, the G signal, and the B signal by the uniformity correction data for the R signal, the G signal, and the B signal.

8 Claims, 6 Drawing Sheets

(51) Int. Cl.
  *H04N 17/04* (2006.01)
  *H04N 17/02* (2006.01)
  *H04N 9/68* (2006.01)

(52) U.S. Cl.
  CPC ..... *H04N 17/04* (2013.01); *G09G 2320/0233* (2013.01); *G09G 2320/0285* (2013.01); *G09G 2320/0666* (2013.01); *G09G 2360/145* (2013.01)

(56) References Cited

U.S. PATENT DOCUMENTS

| | | | |
|---|---|---|---|
| 2006/0158416 A1* | 7/2006 | Ku | G09G 5/06 345/98 |
| 2007/0103706 A1 | 5/2007 | Bing et al. | |
| 2013/0258146 A1* | 10/2013 | Hunter | H04N 5/3572 348/246 |
| 2014/0035966 A1* | 2/2014 | Inagaki | G09G 5/10 345/690 |

FOREIGN PATENT DOCUMENTS

| | | |
|---|---|---|
| JP | 2005-115400 A | 4/2005 |
| JP | 2006-84729 A | 3/2006 |
| JP | 2007-140152 A | 6/2007 |
| JP | 2011-209639 A | 10/2011 |

OTHER PUBLICATIONS

PCT/ISA/237 dated Jun. 30, 2015 issued in corresponding International Application No. PCT/JP2015/063730.

* cited by examiner

FIG. 5
(a)
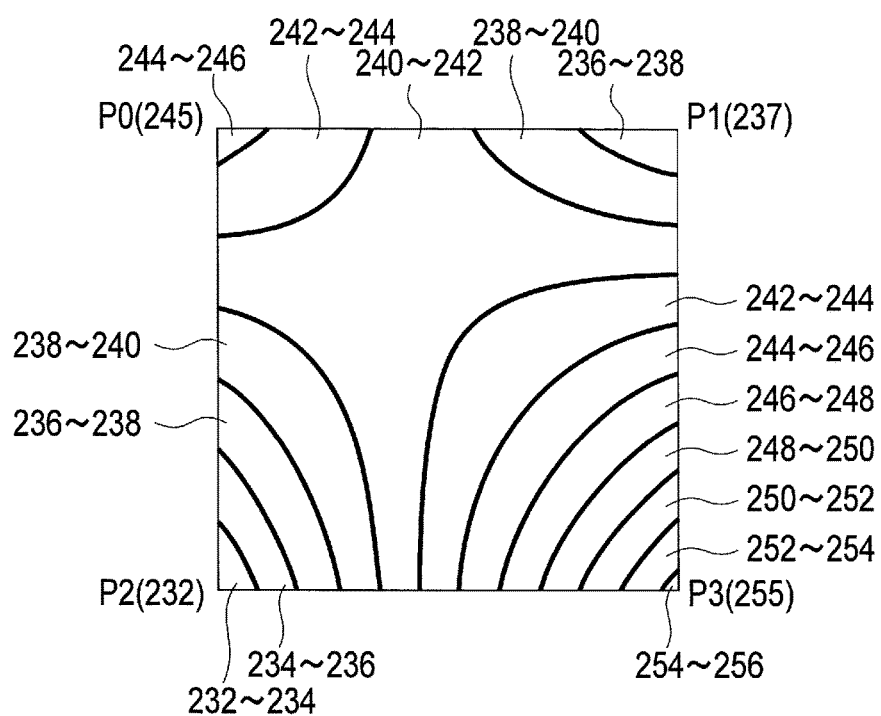
(b)
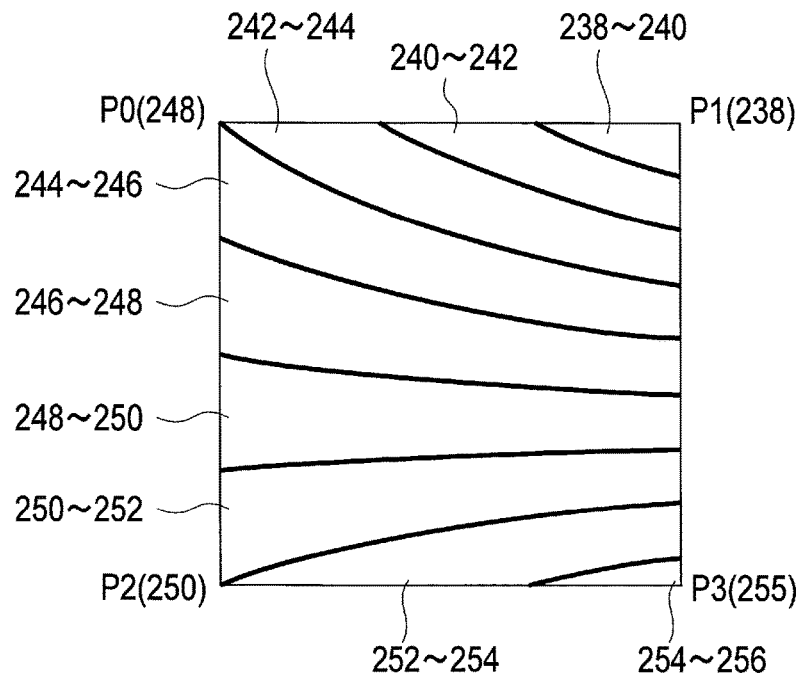

IMAGE PROCESSING PROVIDING UNIFORMITY CORRECTION DATA GENERATION FOR COLOR SIGNALS

CROSS REFERENCE TO RELATED APPLICATION

This application is a Continuation of PCT Application No. PCT/JP2015/063730, filed on May 13, 2015, and claims the priority of Japanese Patent Application No. 2014-171282, filed on Aug. 26, 2014, the entire contents of both of which are incorporated herein by reference.

BACKGROUND

The present disclosure relates to an image processing device, an image processing method, and an image display device which are capable of reducing brightness unevenness.

In an image display device using a matrix display panel such as a liquid crystal panel, a plasma display panel, and an organic electroluminescence panel, the brightness on the screen is not always constant on the whole of the screen, and brightness unevenness sometimes occurs thereon. The brightness unevenness also sometimes occurs due to variations of physical properties of a product.

In a studio monitor or a medical monitor, accuracy required against the brightness unevenness is high, and it is necessary to reduce the brightness unevenness as much as possible. Correcting the brightness unevenness so that the brightness on the screen is uniformed is referred to as uniformity correction.

SUMMARY

It has emerged that brightness unevenness with a predetermined shape occurs even if the uniformity correction was made by a conventional image processing device, so that the brightness on the screen becomes approximately constant on the whole of the screen.

A first aspect of the embodiment provides an image processing device including: a uniformity correction data generation unit configured to generate uniformity correction data for an R signal, which is used to multiply the R signal thereby, uniformity correction data for a G signal, which is used to multiply the G signal thereby, and uniformity correction data for a B signal, which is used to multiply the B signal thereby, in order to correct brightness unevenness on a screen of a display unit at a time of supplying the R signal, the G signal, and the B signal to the display unit and displaying an image; and a multiplier configured, to multiply each of pixel signals, which compose the R signal, by the uniformity correction data for the R signal, to multiply each of pixel signals, which compose the G signal, by the uniformity correction data for the G signal, and to multiply each of pixel signals, which compose the B signal, by the uniformity correction data for the B signal, wherein positions of pixels when the multiplier multiplies each of the pixel signals, which compose the R signal, by the uniformity correction data for the R signal, positions of pixels when the multiplier multiplies each of the pixel signals, which compose the G signal, by the uniformity correction data for the G signal, and positions of pixels when the multiplier multiplies each of the pixel signals, which compose the B signal, by the uniformity correction data for the B signal are shifted from one another.

A second aspect of the embodiment provides an image processing method including: individually generating uniformity correction data for an R signal, which is used to multiply the R signal thereby, uniformity correction data for a G signal, which is used to multiply the G signal thereby, and uniformity correction data for a B signal, which is used to multiply the B signal thereby, in order to correct brightness unevenness on a screen of a display unit at a time of supplying the R signal, the G signal, and the B signal to the display unit and displaying an image; multiplying each of pixel signals, which compose the R signal, by the uniformity correction data for the R signal; multiplying each of pixel signals, which compose the G signal, by the uniformity correction data for the G signal; multiplying each of pixel signals, which compose the B signal, by the uniformity correction data for the B signal; and from one another, shifting positions of pixels at a time of multiplying each of the pixel signals, which compose the R signal, by the uniformity correction data for the R signal, positions of pixels at a time of multiplying each of the pixel signals, which compose the G signal, by the uniformity correction data for the G signal, and positions of pixels at a time of multiplying each of the pixel signals, which compose the B signal, by the uniformity correction data for the B signal.

A third aspect of the embodiment provides an image display device including: the image processing device; and the display unit.

BRIEF DESCRIPTION OF THE DRAWINGS

FIG. 5 is a view showing examples of correction values which the uniformity correction data interpolator 12 generates by the interpolation.

DETAILED DESCRIPTION

Hereinafter, a description is made of an image processing device, an image processing method, and an image display device according to an embodiment with reference to the accompanying drawings.

Figure 1:
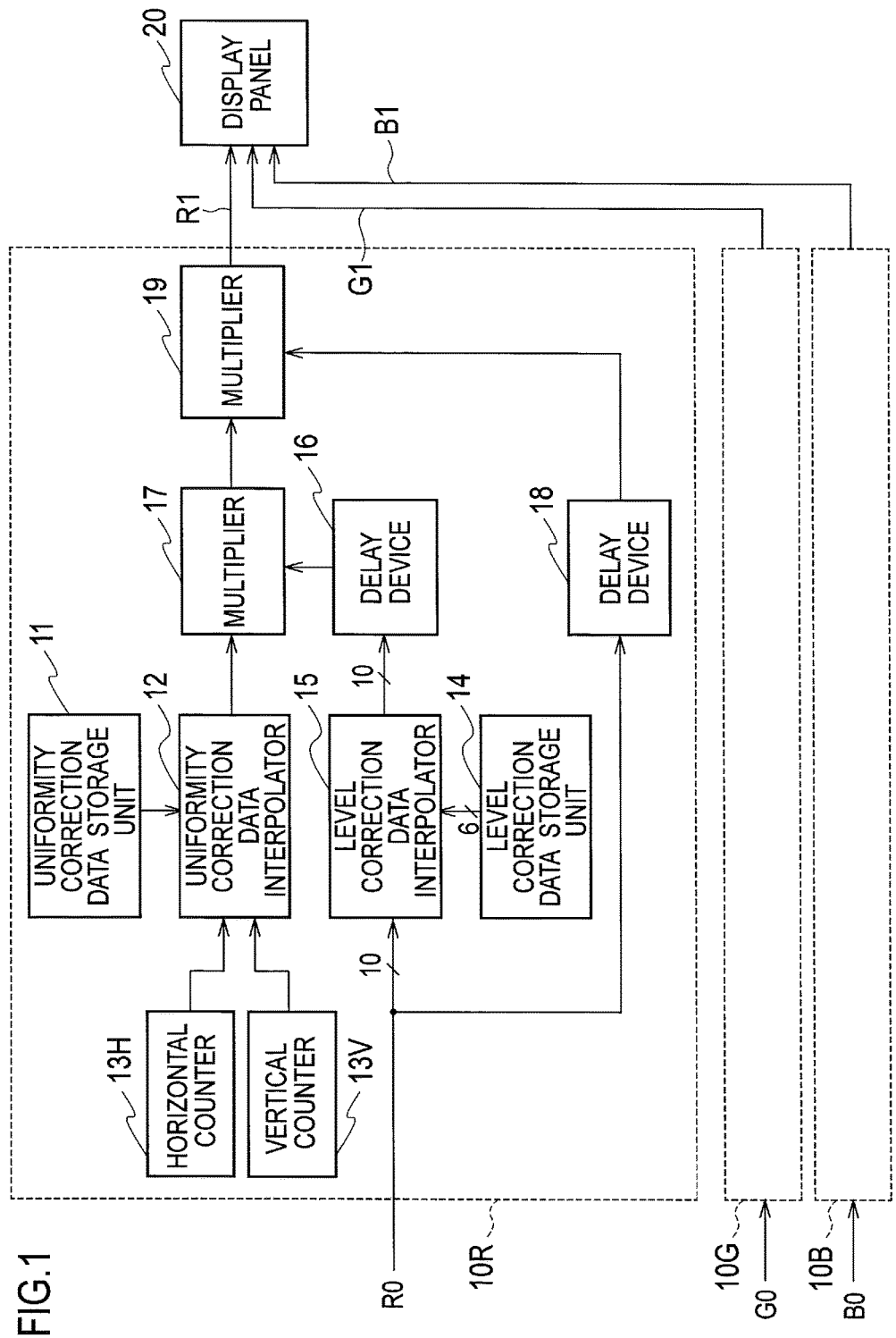
FIG. 1 is a block diagram showing an image processing device and image display device according to at least one embodiment.

In FIG. 1, an image processing device 10R processes an R signal in RGB signals in order to correct the brightness unevenness of an image displayed on a display panel 20. Image processing devices 10G and 10B process a G signal and a B signal in the RGB signals, respectively, in order to correct the brightness unevenness of the image displayed on the display panel 20.

The display panel 20 is a matrix display panel, for example, in which pixels are arranged in a matrix of horizontal 1920 pixels and vertical 1080 pixels. The display panel 20 is an example of a display unit that displays an image based on video signals such as RGB signals. The resolution of the display panel is not necessarily limited to the horizontal 1920 pixels and the vertical 1080 pixels.

The image processing devices 10R, 10G, and 10B compose the image processing device according to the embodiment. Internal configurations of the image processing devices 10G and 10B are the same as that of the image processing device 10R. The image processing devices 10R, 10G, and 10B and the display panel 20 compose the image display device according to the embodiment.

The RGB signals before uniformity correction, which are inputted into the image processing devices 10R, 10G, and 10B, are referred to as an input R signal R0, an input G signal G0, and an input B signal B0, respectively. It is assumed that each of the input R signal R0, the input G signal G0, and the input B signal B0 has 10 bits.

The RGB signals, which are subjected to uniformity correction by the image processing devices 10R, 10G, and 10B, are referred to as an output R signal R1, an output G signal G1, and an output B signal B1, respectively.

It is assumed that the input R signal R0, the input G signal G0, and the input B signal B0 are color signals having the same resolution as the resolution of the display panel 20.

A uniformity correction data storage unit 11 stores reference uniformity correction data for making the uniformity correction individually for the input R signal R0, the input G signal G0, and the input B signal B0. The uniformity correction data storage unit 11 can be composed of an arbitrary memory.

Figure 2:
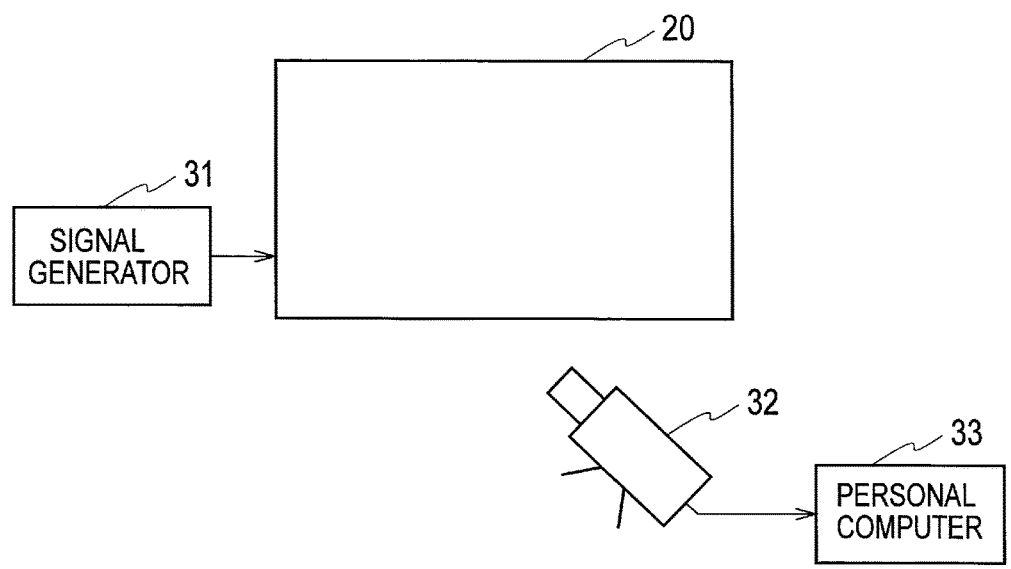
FIG. 2 is a conceptual diagram showing a state where XYZ tristimulus values on a screen are measured by a two-dimensional brightness measuring instrument in order to generate reference uniformity correction data.
Figure 3:
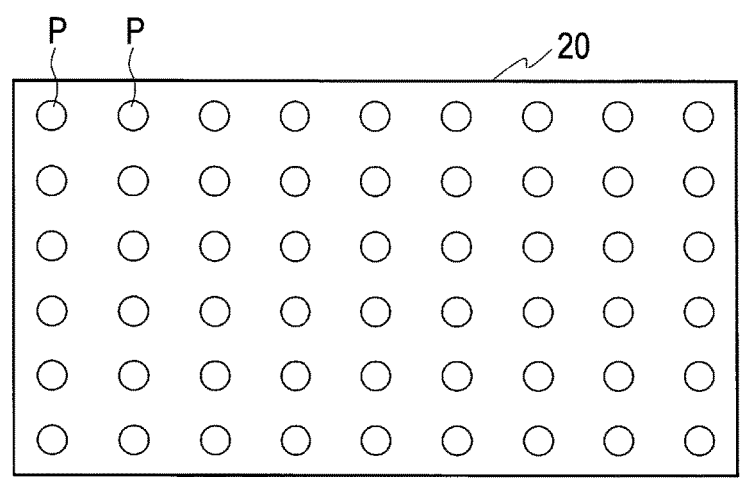
FIG. 3 is a diagram showing examples of reference coordinates set on the screen.

By using FIG. 2 and FIG. 3, a description is made of how to generate the reference uniformity correction data. The display panel 20 displays a test pattern for measurement, which is generated by a signal generator 31. The test pattern for measurement is a 50% white signal, for example.

A two-dimensional brightness measuring instrument 32 measures XYZ tristimulus values on the whole of the screen of the display panel 20. A personal computer 33 captures the XYZ tristimulus values measured by the two-dimensional brightness measuring instrument 32.

As shown in FIG. 3, for example, the personal computer 33 sets, as reference coordinates P, 54 points as a product of horizontal 9 points and vertical 6 points on the display panel 20. The number of reference coordinates just needs to be set to an optimum number in response to the resolution of the display panel 20. The reference coordinates P are set at an equal interval in the horizontal direction and at an equal interval in the vertical direction.

The personal computer 33 calculates an average value of the XYZ tristimulus values within a predetermined range, indicated by a circle including the reference coordinates P. Such an average value of the XYZ tristimulus values within one range is referred to as a reference XYZ tristimulus value. Note that the predetermined range just needs to be set to a range of several pixels to several dozen pixels, which include a pixel located on the reference coordinates P.

In this way, the personal computer 33 can obtain the reference XYZ tristimulus values of the 54 points.

The personal computer 33 converts the reference XYZ tristimulus values of the 54 points into RGB values. Such RGB values converted from the reference XYZ tristimulus values are referred to as reference RGB values.

Usually, the reference RGB values of the 54 points are not constant values, causing brightness unevenness. Typically, the reference RGB values are higher in the center portion of the screen than in the peripheral portions of the screen. The ways in which the reference RGB values vary sometimes differ among individual display panels 20.

In order to correct the brightness unevenness, the personal computer 33 generates the reference uniformity correction data made of reference correction values, which take, as a reference, a reference RGB value of a point with the lowest brightness among the reference RGB values of the 54 points, and uniform the brightness by lowering the other reference RGB values.

The uniformity correction data storage unit 11 stores the reference uniformity correction data made of the reference correction values of the 54 points, which are generated in such a manner as above.

Returning to FIG. 1, the uniformity correction data is inputted into a uniformity correction data interpolator 12. By using reference correction values of four points as the reference coordinates P located in diagonal directions to the reference coordinates P adjacent to each other in the horizontal direction and the vertical direction, the uniformity correction data interpolator 12 generates correction values other than those for the reference coordinates P by two-dimensional linear interpolation. The uniformity correction data interpolator 12 can be composed of an interpolation circuit.

Figure 4:
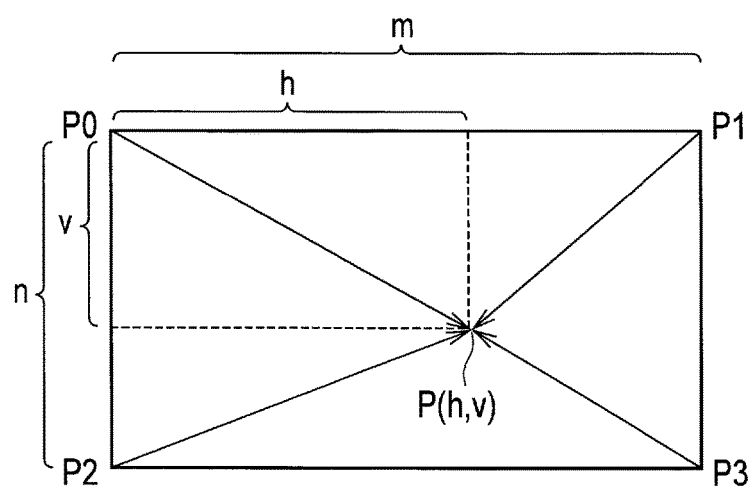
FIG. 4 is a diagram for explaining an operation that a uniformity correction data interpolator 12 in FIG. 1 interpolates uniformity correction data based on the reference uniformity correction data.

In FIG. 4, the reference coordinates P0, P1, P2, and P3 indicate arbitrary four points composed of the reference coordinates P located in the diagonal directions to the reference coordinates P adjacent to each other in the horizontal direction and the vertical direction among the reference coordinates P of the 54 points.

An interval (number of pixels) between the reference coordinates P0 and P1 and between the reference coordinates P2 and P3 is defined to be m, an interval (number of pixels) between the reference coordinates P0 and P2 and between the reference coordinates P1 and P3 is defined to be n, and coordinates at a position apart from the reference coordinates P0 by h in the horizontal direction and by v in the vertical direction are defined to be coordinates P(h,v).

When the reference correction values at the reference coordinates P0, P1, P2, and P3 are defined to be D0, D1, D2, and D3, and a correction value at the coordinates P(h, v) is defined to be D(h, v), the correction value D(h, v) can be obtained by the following Equation (1) with two-dimensional linear interpolation.

$$D(h, v) = \frac{(m-h)(n-v)D0 + h(n-v)D1 + (m-h)vD2 + hvD3}{mn} \quad (1)$$

To the uniformity correction data interpolator 12, a horizontal count value is inputted from the horizontal counter 13H, and a vertical count value is inputted from the vertical counter 13V. The horizontal count value is an example of position information indicating the position in the horizontal direction on the screen. The vertical count value is an example of position information indicating the position in the vertical direction on the screen.

The uniformity correction data interpolator 12 can grasp the position in the horizontal direction and the vertical direction on the screen based on the horizontal count value and the vertical count value.

The uniformity correction data interpolator 12 generates the correction value D(h, v) based on the horizontal count value and the vertical count value.

(a) and (b) of FIG. 5 show examples of the correction values generated by the uniformity correction data interpolator 12.

(a) of FIG. 5 shows the correction values, which are generated by the uniformity correction data interpolator 12, in a case where the reference correction values D0, D1, D2, and D3 on the reference coordinates P0, P1, P2, and P3 are 245, 237, 232, and 255, respectively.

(b) of FIG. 5 shows the correction values, which are generated by the uniformity correction data interpolator 12, in a case where the reference correction values D0, D1, D2, and D3 on the reference coordinates P0, P1, P2, and P3 are 248, 238, 250, and 255, respectively.

In (a) and (b) of FIG. 5, for simplification, the correction values are divided every two stages, and distribution of the correction values of the respective stages are shown. As understood from (a) and (b) of FIG. 5, the uniformity correction data interpolator 12 can generate the correction value D(h, v) that is changed smoothly between the reference coordinates P0, P1, P2, and P3.

In such a way as described above, the uniformity correction data interpolator 12 outputs the uniformity correction data, which is capable of correcting the whole of each of the frames of the input R signal R0, the input G signal G0, and the input B signal B0 by performing interpolation between the reference correction values.

Incidentally, if the horizontal 1920 pixels are divided equally into eight pieces, then the interval m in FIG. 4 becomes 240, and if the vertical 1080 pixels are divided into five pieces, then the interval n in FIG. 4 becomes 216. The uniformity correction data interpolator 12 may generate the correction values while setting the intervals m and n to 240 and 216, respectively; however, in this embodiment, the correction values are generated while setting the intervals m and n both to 256, respectively, so that it can be easy to perform an arithmetic operation in the correction circuit. The intervals just need to be decided based on the resolution of the panel 20, a tolerance of the uniformity correction data, and required quality.

If the uniformity correction data interpolator 12 sets each of the intervals between the reference coordinates adjacent to each other in the horizontal direction and the vertical direction to the power of 2, then it becomes easy to calculate the correction values by using Equation (1).

If the uniformity correction data interpolator 12 generates the correction value while setting the intervals m and n to 256 and 256, respectively, then correction values in the matrix of horizontal 2048 and vertical 1280 are generated. If each of the input R signal R0, the input G signal G0 and the input B signal B0 has a matrix of horizontal 1920 pixels and vertical 1080 pixels, then correction values in such a matrix of the horizontal 1920 and the vertical 1080 among correction values in a matrix of horizontal 2048 and vertical 1280 just need to be used.

Figure 6:
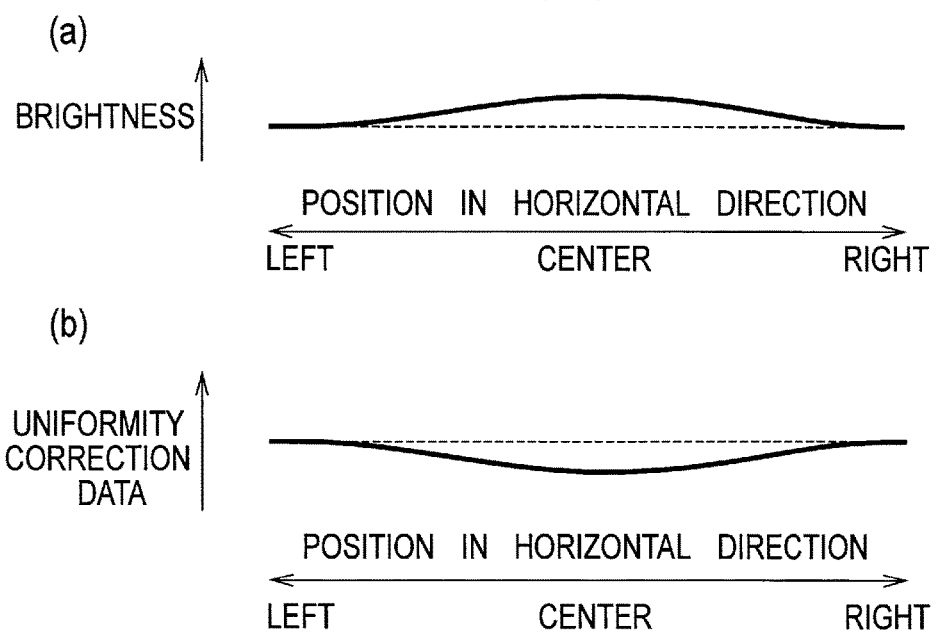
FIG. 6 is a characteristic diagram showing a relationship between characteristics of brightness on the screen and the uniformity correction data.

It is assumed that, as shown in (a) of FIG. 6, the brightness on the screen of the display panel 20 has high characteristics in the center portion thereof in the horizontal direction. Here, the characteristics in only the horizontal direction are shown for simplification.

As shown in (b) of FIG. 6, the uniformity correction data storage unit 11 and the uniformity correction data interpolator 12 generate and output such uniformity correction data as lowering the brightness in the center portion in the horizontal direction by the operations described above.

The uniformity correction data storage unit 11 and the uniformity correction data interpolator 12 are a uniformity correction data generation unit, which generates uniformity correction data for the R signal, which is used to multiply the R signal thereby, uniformity correction data for the G signal, which is used to multiply the G signal thereby, and uniformity correction data for the B signal, which is used to multiply the B signal thereby.

If an RGB signal having the characteristics shown in (a) of FIG. 6 is multiplied by the uniformity correction data shown in (b) of FIG. 6, then the brightness on the screen is uniformed, whereby the brightness unevenness can be corrected.

In the embodiment, the uniformity correction data generation unit is composed of the uniformity correction data storage unit 11 and the uniformity correction data interpolator 12; however, is not limited to this.

However, the uniformity correction data storage unit 11 only stores the reference uniformity correction data made of the reference correction values of the plurality of points, and accordingly, can reduce the amount of data, which is to be stored, in comparison with a case of storing the correction values on all points on the screen.

Incidentally, if the uniformity correction data shown in (b) of FIG. 6 is used for multiplication in an area with a low color signal level, then the level of each of the input R signal R0, the input G signal G0, and the input B signal B0 approximates to 0. Then, the white balance is disturbed in some cases.

A multiplier 17, a level correction data storage unit 14, a level correction data interpolator 15, and a delay device 16 in FIG. 1 are provided in order to prevent the white balance from being disturbed in an area with a low color signal level when the uniformity correction is performed.

Figure 7:
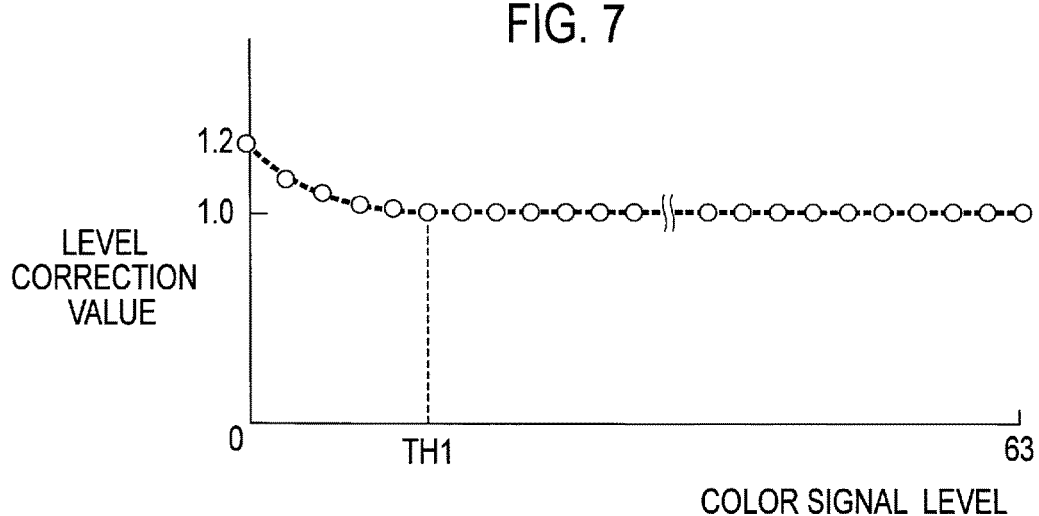
FIG. 7 is a characteristic diagram showing an example of level correction data stored in a level correction data storage unit 14 in FIG. 1.

For example, level correction data of 6 bits is stored in the level correction data storage unit 14. As shown in FIG. 7, the level correction data is data that defines a level correction value, which is indicated by white circles, for the color signal level when the input R signal R0, the input G signal G0, and the input B signal B0 are expressed by 6 bits. The level correction data storage unit 14 can be composed of a lookup table (or an arbitrary memory that stores the lookup table).

With regard to the level correction data, the level correction value thereof is, for example, 1.2 exceeding 1.0 when the color signal level is 0, and the level correction value gradually decreases step by step to 1.0 where the color signal level is the threshold value TH1 as a predetermined low level, and on and after the threshold value TH1, the level correction value is 1.0 that is a constant value.

To the level correction data interpolator 15, there are inputted: the input R signal R0, the input G signal G0, and the input B signal B0; and the level correction data read out from the level correction data storage unit 14.

The level correction data interpolator 15 interpolates the level correction value, which corresponds to the color signal level of each of the input R signal R0, the input G signal G0, and the input B signal B0 of 10 bits based on the level correction data of 6 bits. The level correction data interpolator 15 can be composed of an interpolation circuit.

Figure 8:
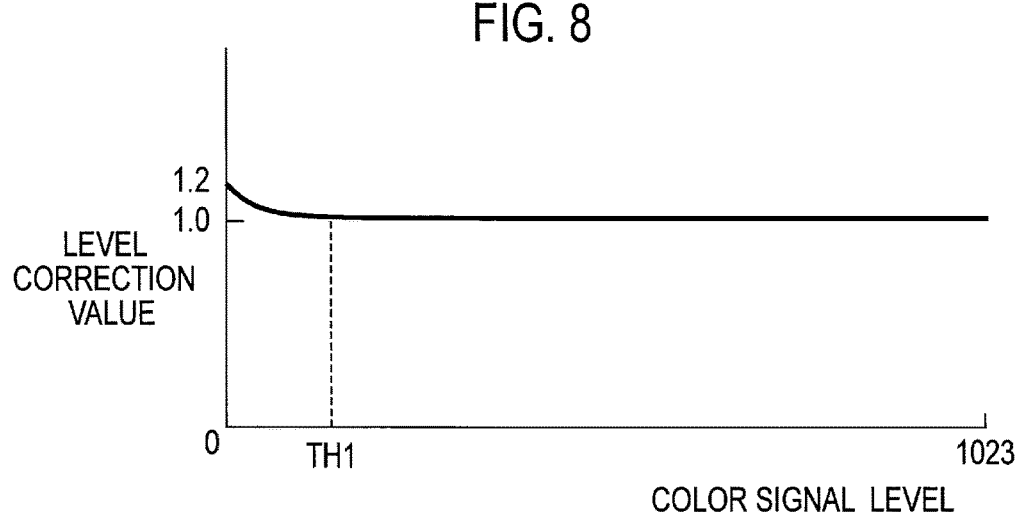
FIG. 8 is a characteristic diagram showing an example of level correction data outputted from a level correction data interpolator 15 in FIG. 1.

The level correction data interpolator 15 interpolates the level correction value, whereby such level correction data as shown in FIG. 8, which defines the level correction value with respect to the 10-bit color signal level, is outputted from the level correction data interpolator 15.

In FIG. 8, the threshold value TH1 just needs to be set to an appropriate value such as a color signal level of 80, for example. The threshold value TH1 just needs to be set within a range where the color signal level is as low as approximately 60 to 100, and a value, which is to be set specifically, just needs to be decided as a design matter.

The 10-bit level correction data outputted from the level correction data interpolator 15 is inputted to the delay device 16. The delay device 16 delays the level correction data so that the level correction data can coincide with timing when the uniformity correction data storage unit 11 and the uniformity correction data interpolator 12 generate and output the uniformity correction data, and then supplies the delayed level correction data to the multiplier 17.

The multiplier 17 multiplies the uniformity correction data shown in (b) of FIG. 6 and the level correction data shown in FIG. 8 by each other. If the color signal level is the threshold value TH1 or more, then the multiplier 17 outputs the inputted uniformity correction data as it is.

If the color signal level is less than the threshold value TH1, then the multiplier 17 multiplies the inputted uniformity correction data by the level correction value, which is larger as the color signal level becomes smaller, and outputs the multiplied uniformity correction data.

Figure 9:
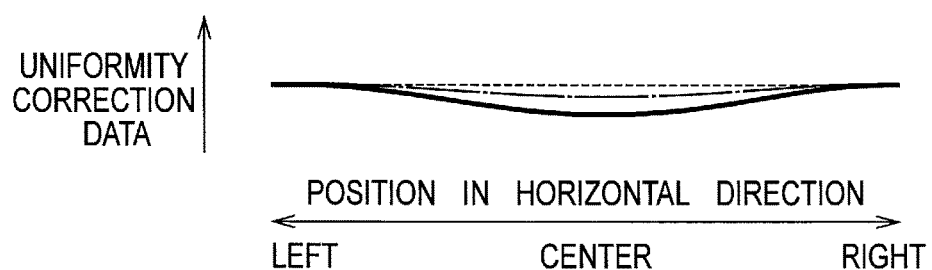
FIG. 9 is a characteristic diagram showing a corrected state of the uniformity correction data by the level correction data shown in FIG. 8.

Hence, with regard to the uniformity correction data outputted from the multiplier 17, when the color signal level is less than the threshold value TH1, a correction value thereof shown by a solid line is corrected to a correction value shown by an alternate long and short dashed line as shown in FIG. 9. That is, when the color signal level is less than the threshold value TH1, the uniformity correction is weakened. Hence, the white balance is prevented from being disturbed.

Portions ranging from the level correction data storage unit 14 to the multiplier 17, which are described above, compose a level correction unit that makes a correction to reduce the amplitude of the uniformity correction data of each of the colors when each of the color signal levels of the input R signal R0, the input G signal G0, and the input B signal B0 is less than the predetermined threshold value TH1.

The level correction unit is a constituent for preventing the white balance from being disturbed in the range where the color signal level is low, and accordingly, is capable of being omitted in the case where the white balance is not emphasized. A constituent from which the level correction unit is omitted is a constituent that emphasizes the uniformity correction in the whole range of the color signal level.

In the embodiment, the level correction unit is the constituent including the level correction data storage unit 14 and the level correction data interpolator 15; however, it is not limited to this.

The level correction data storage unit 14 may be composed of a lookup table that stores 10-bit level correction data, and the level correction data interpolator 15 may be omitted. However, if the level correction data storage unit 14 is composed of the lookup table that stores the 6-bit level correction data, then the amount of data to be stored can be reduced.

The uniformity correction data outputted from the multiplier 17 is inputted to a multiplier 19.

The input R signal R0, the input G signal G0, and the input B signal B0 are also inputted to a delay device 18. The delay device 18 delays the input R signal R0, the input G signal G0, and the input B signal B0 so that the input R signal R0, the input G signal G0, and the input B signal B0 can coincide with the timing of generating and outputting the uniformity correction data, and then the delay device 18 supplies the delayed input R signal R0, input G signal G0, and input B signal B0 to the multiplier 19.

The multiplier 19 multiplies the input R signal R0, the input G signal G0, and the input B signal B0, which are delayed by the delay device 18, by the uniformity correction data outputted from the multiplier 17. In this way, the multiplier 19 outputs the output R signal R1, the output G signal G1, and the output B signal B1, which are subjected to the uniformity correction.

The output R signal R1, the output G signal G1, and the output B signal B1 are supplied to the display panel 20, and are displayed as an image thereon.

By the configuration and the operations, which are described above, the image processing device, the image processing method, and the image display device according to the embodiment can make a uniformity correction for the brightness on the screen so that the brightness on the screen can become approximately constant on the whole of the screen. Moreover, the brightness unevenness of each of the R signal, the G signal, and the B signal is individually corrected, whereby color unevenness can be corrected as a result.

Figure 10:
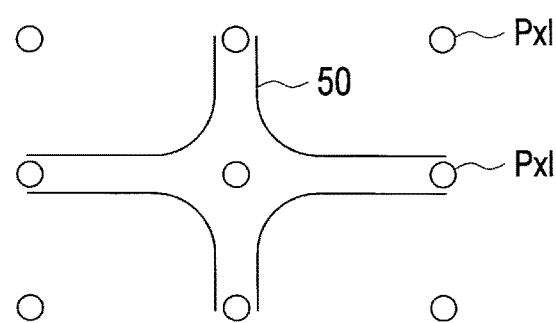
FIG. 10 is a diagram showing an example of grid-like brightness unevenness that occurs on the screen.

However, by the inspection of the inventor of the present invention, it has emerged that grid-like brightness unevenness 50 occurs as shown in FIG. 10, even if the uniformity correction was made so that the brightness on the screen can become approximately constant on the whole of the screen. White circles in FIG. 10 indicate the pixels Px1.

The grid-like brightness unevenness 50 occurs in each red image that is based on the output R signal R1, in each green image that is based on the output G signal G1, and in each blue image that is based on the output B signal B1; the red, green, and blue images being displayed on the display panel 20.

Accordingly, in the image processing device, the image processing method, and the image display device according to the embodiment, the grid-like brightness unevenness 50 is reduced as follows.

In FIG. 1, the multiplier 19 of the image processing device 10R multiplies a pixel signal of the R signal by the uniformity correction data for the R signal. The multiplier 19 of the image processing device 10G multiplies a pixel signal of the G signal by the uniformity correction data for the G signal. The multiplier 19 of the image processing device 10B multiplies a pixel signal of the B signal by the uniformity correction data for the B signal.

At this time, the multipliers 19 of the image processing devices 10R, 10G, and 10B shift from one another the positions of pixels at the time of multiplying the pixel signals of the RGB signals by the uniformity correction data.

As mentioned above, the uniformity correction data interpolator 12 performs the interpolation for correction values at points other than the plurality of points, which serve as references, by using the position information in the horizontal direction and the vertical direction on the screen.

The respective uniformity correction data interpolators 12 in the image processing devices 10R, 10G, and 10B shift the position information for use at the time of generating the uniformity correction data for the R signal, the G signal, and the B signal in the horizontal direction and the vertical direction. In this way, the positions of the pixels at the time of multiplying the pixel signals of the RGB signals by the uniformity correction data can be shifted from one another.

Specifically, for example, measures just need to be taken as follows. The horizontal count value by the horizontal counter 13H of the image processing device 10R and the vertical count value by the vertical counter 13V thereof are started from 0. The horizontal count value by the horizontal counter 13H of the image processing device 10G and the vertical count value by the vertical counter 13V thereof are started from 10.

The horizontal count value by the horizontal counter 13H of the image processing device 10B and the vertical count value by the vertical counter 13V thereof are started from 20.

As described above, starting values of the horizontal count values and the vertical count values are shifted from one another, whereby the positions of the pixels at the time of multiplying the pixel signals of the RGB signals by the uniformity correction data can be easily shifted from one another by approximately several pixels to several dozen pixels.

The grid-like brightness unevenness 50 shown in FIG. 10 is almost cancelled since the red image, the green image, and the blue image are shifted in position from one another, and the occurrence of the brightness unevenness 50 can be reduced to a large extent.

As described with reference to FIG. 3, each of the reference RGB values are calculated based on the average value of the XYZ tristimulus values within the range of approximately several pixels to several dozen pixels, which include the pixel located on the reference coordinates P. Hence, a harmful effect does not particularly occur, which may be caused by shifting the positions of the pixels from one another at the time of multiplying the pixel signals of the RGB signals by the uniformity correction data.

As described above, in accordance with the image processing device, the image processing method, and the image display device according to the embodiment, uniformity correction can be made so that the brightness on the screen becomes approximately constant on the whole of the screen, and further, the brightness unevenness with a predetermined shape can also be reduced.

The present invention is not limited to the embodiment described above, and is changeable in various ways within the scope without departing from the scope of the present invention. In an event of configuring the image processing device according to the embodiment, the choice of hardware and software is arbitrary. A part of the configuration shown in FIG. 1 may be composed of software, which is stored on computer readable media.

What is claimed is:

1. An image processing device comprising:
a uniformity correction data storage unit comprising a memory for storing reference uniformity correction data for an R signal, reference uniformity correction data for a G signal, and reference uniformity correction data for a B signal, the reference uniformity correction data for the R, G, and B signals comprising reference correction values for the R, G, and B signals on reference coordinates set on a single panel of a display unit, the single panel comprising a first number of horizontal pixels and a second number of vertical pixels, a number of the reference coordinates in the horizontal direction being smaller than the first number, and a number of the reference coordinates in the vertical direction being smaller than the second number;
a uniformity correction data interpolator comprising an interpolation circuit configured to generate uniformity correction data for the R signal, which is used to multiply the R signal thereby, uniformity correction data for the G signal, which is used to multiply the G signal thereby, and uniformity correction data for the B signal, which is used to multiply the B signal thereby, in order to correct brightness unevenness on the single panel at a time of supplying the R, G and B signals to the display unit and displaying an image, in such a way that the uniformity correction data interpolator generates correction values other than those for the reference coordinates by interpolation based on the reference correction values, and that the uniformity correction data interpolator generates uniformity correction data for the R, G, and B signals comprising a third number of correction values in the horizontal direction and a fourth number of correction values in the vertical direction, the third number being greater than the first number, and the fourth number being greater than the second number; and
a multiplier configured, to multiply each of pixel signals, which compose the R signal, by the uniformity correction data for the R signal, to multiply each of pixel signals, which compose the G signal, by the uniformity correction data for the G signal, and to multiply each of pixel signals, which compose the B signal, by the uniformity correction data for the B signal,
wherein positions of pixels with respect to positions of the correction values when the multiplier multiplies each of the pixel signals, which compose the R signal, by the correction values of the uniformity correction data for the R signal, positions of pixels with respect to positions of the correction values when the multiplier multiplies each of the pixel signals, which compose the G signal, by the correction values of the uniformity correction data for the G signal, and positions of pixels with respect to positions of the correction values when the multiplier multiplies each of the pixel signals, which compose the B signal, by the correction values of the uniformity correction data for the B signal are shifted from one another.

2. The image processing device according to claim 1,
wherein the uniformity correction data interpolator interpolates the correction values by using position information in each of the horizontal direction and the vertical direction on the screen, and
position information for use when the uniformity correction data interpolator generates the uniformity correction data for the R signal, position information for use when the uniformity correction data interpolator generates the uniformity correction data for the G signal, and position information for use when the uniformity correction data interpolator generates the uniformity correction data for the B signal are shifted from one another in the horizontal direction and the vertical direction, whereby the positions of the pixels with respect to positions of the correction values when the multiplier multiplies each of the pixel signals, which compose the R signal, by the uniformity correction data for the R signal, the positions of the pixels with respect to positions of the correction values when the multiplier multiplies each of the pixel signals, which compose the G signal, by the uniformity correction data for the G signal, and the positions of the pixels with respect to positions of the correction values when the multiplier multiplies each of the pixel signals, which compose the B signal, by the uniformity correction data for the B signal are shifted from one another in the horizontal direction and the vertical direction.

3. The image processing device according to claim 1, further comprising:
a level correction circuit configured to make a correction to reduce an amplitude of each of the uniformity correction data for the R signal, the uniformity correction data for the G signal, and the uniformity correction data for the B signal, when each of color signal levels of the R signal, the G signal, and the B signal is less than a predetermined threshold value.

4. An image processing method comprising:
using hardware, software, or a combination of hardware and software to individually generate uniformity correction data for an R signal, which is used to multiply the R signal thereby, uniformity correction data for a G signal, which is used to multiply the G signal thereby, and uniformity correction data for a B signal, which is used to multiply the B signal thereby, in order to correct brightness unevenness on a single panel of a display unit at a time of supplying the R signal, the G signal, and the B signal to the display unit and displaying an image, the single panel comprising a first number of horizontal pixels and a second number of vertical pixels, the uniformity correction data for the R, G, and B signals comprising a third number of correction values in the horizontal direction and a fourth number of correction values in the vertical direction, the third number being greater than the first number, and the fourth number being greater than the second number;
using hardware, software, or a combination of hardware and software to multiply each of pixel signals, which compose the R signal, by the correction values of the uniformity correction data for the R signal;
using hardware, software, or a combination of hardware and software to multiply each of pixel signals, which compose the G signal, by the correction values of the uniformity correction data for the G signal;
using hardware, software, or a combination of hardware and software to multiply each of pixel signals, which compose the B signal, by the correction values of the uniformity correction data for the B signal; and
using hardware, software, or a combination of hardware and software to shift positions of pixels with respect to positions of the correction values at a time of multiplying each of the pixel signals, which compose the R signal, by the uniformity correction data for the R signal, positions of pixels with respect to positions of the correction values at a time of multiplying each of the pixel signals, which compose the G signal, by the uniformity correction data for the G signal, and positions of pixels with respect to positions of the correction values at a time of multiplying each of the pixel signals, which compose the B signal, by the uniformity correction data for the B signal from one another, said software stored on computer readable media.

5. An image display device comprising:
the image processing device according to claim 1; and
the display unit comprising the single panel.

6. An image processing program stored in a non-transitory storage medium, the image processing program causing a computer to execute:
a step of individually generating uniformity correction data for each of a plurality of color signals, respectively used to multiply the respective color signals thereby, in order to correct brightness unevenness on a single panel of a display unit at a time of supplying the respective color signals to the display unit and displaying an image, the single panel comprising a first number of horizontal pixels and a second number of vertical pixels, the uniformity correction data for the respective color signals comprising a third number of correction values in the horizontal direction and a fourth number of correction values in the vertical direction, the third number being greater than the first number, and the fourth number being greater than the second number;
step of multiplying each of pixel signals, which compose the respective color signals, respectively by the correction values of the uniformity correction data for the respective color signals; and
a step of shifting positions of pixels with respect to positions of the correction values from one another at a time of multiplying each of the pixel signals, which compose the respective color signals, by the correction values of the uniformity correction data for the respective color signals.

7. The image processing program of claim 6, wherein:
the step of individually generating uniformity correction data for each of a plurality of color signals comprises generating uniformity correction data for an R signal, which is used to multiply the R signal thereby, generating uniformity correction data for a G signal, which is used to multiply the G signal thereby, and generating uniformity correction data for a B signal, which is used to multiply the B signal thereby;
the step of multiplying each of pixel signals comprises multiplying each of pixel signals, which compose the R signal, by the correction values of the uniformity correction data for the R signal, multiplying each of pixel signals, which compose the G signal, by the correction values of the uniformity correction data for the G signal, multiplying each of pixel signals, which compose the B signal, by the correction values of the uniformity correction data for the B signal; and
the step of shifting positions of pixels with respect to positions of the correction values comprises multiplying each of the pixel signals which compose the R signal, by the correction values of the uniformity correction data for the R signal, multiplying each of the pixel signals which compose the G signal, by the correction values of the uniformity correction data for the G signal, and multiplying each of the pixel signals which compose the B signal, by the correction values of the uniformity correction data for the B signal.

8. The image processing program of claim 7, further comprising:
a step of providing level correction by making a correction to reduce an amplitude of each of the uniformity correction data for the R signal, the uniformity correction data for the G signal, and the uniformity correction data for the B signal, when each of color signal levels of the R signal, the G signal, and the B signal is less than a predetermined threshold value.

* * * * *